2,825,710
PROCESS OF PREPARING A GREASE-PROOFING AGENT

Gastao Etzel, Collingswood, N. J., assignor to E. I. du Pont de Nemours and Company, Wilmington, Del., a corporation of Delaware No Drawing. Application February 20, 1956
Serial No. 566,377

1 Claim. (Cl. 260—29.4)

This invention relates to a novel composition of matter adapted for use as crease-proofing, shrink resistance or calendering agent for textile fabric. More particularly, this invention deals with concentrated aqueous solutions of a condensation product of formaldehyde and dimethyl ether of dimethylol urea, which condensation product appears to consist predominately of dimethylol-di(methoxymethyl)-urea.

I have found that if di(methoxymethyl)-urea is reacted with formaldehyde under alkaline conditions (pH 8 to 10) and at carefully controlled temperature (55° to 65° C.), a water-soluble reaction product is obtained which may be recovered and marketed as a highly concentrated aqueous solution (50% to 70% active ingredient by weight), which upon dilution with water, say to about 2% to 5% A. I. (active ingredient) by weight, produces a treating bath from which cotton or regenerated cellulose, by treatment in manners per se known, can be endowed with crease-proofing, shrink resistance and calendering effects.

The primary object of this invention is therefore to provide a novel composition of the above character and for the purpose hereinabove indicated. A further object is to provide an economical process for producing such composition in a high state of purity, in good yield and with a minimum amount of handling. Other objects and achievements of this invention will become apparent as the description proceeds.

Now, according to this invention, the above objects are achieved by first reacting formaldehyde and urea in aqueous methyl alcohol in a two-step procedure, whereby to produce the dimethyl ether of dimethylol urea in solution, and then causing the reaction mass to react with further quantities of formaldehyde, whereby to introduce free methylol groups into the reaction product. Furthermore, all steps of procedure according to this invention are carried out in the same reaction vessel and under controlled conditions, whereby to avoid resinification and to achieve the reaction within a relatively short reaction period.

More particularly, my preferred procedure consists of three reaction steps and a recovery step which are, in general outline, as follows:

The first step of the reaction involves formation of dimethylol urea in an aqueous methanol solution. In this step the molar ratio of methanol to urea should be at least 5:1, but preferably not more than 8:1. Lower ratios than 5:1 tend to give inferior products, whereas higher ratios than 8:1 are not economically justified. The pH of the reaction mass during this stage is maintained between 7.5 and 9. Below the lower limit resinous by-products tend to be formed, whereas at pH values above 9, the reaction is so slow as to be impractical on a commercial scale.

The temperature of this step is kept between 65° and 75° C. In this temperature range, the formation of dimethylol urea may be completed in about two hours' time, whereas lower temperatures require impractically long reaction periods.

At the end of this first phase of my improved process, the reaction mixture is cooled to about 20° to 35° C., either by letting it stand or by applying exterior cooling. The reaction mass is then acidified with any convenient acid such as sulfuric, hydrochloric, tartaric, acetic, oxalic or citric, to a pH of between 4.0 and 5.0. By warming up the mass to the range of 35° to 45° C., etherification of the methylol groups by the methyl alcohol which is present in the reaction mass sets in. This is a rapid reaction and normally will require from about 15 minutes to an hour for completion.

At the end of the etherification step, the third and final step of the synthesis is carried out to introduce additional methylol groups. For this purpose, the reaction mass is brought to a pH of between 8 and 10, stoichiometric amounts of formaldehyde (2 moles per mole of initial urea) are added, and the reaction mass is heated at 55° to 65° C. Preferably, sodium carbonate will be used as needed, to adjust the pH between 8 and 10 and to maintain it in this range during the heating, but other alkaline materials such as alkali metal hydroxides may be used as well. Normally this phase of the reaction is completed in about 2 to 4 hours.

After the reaction is completed, the reaction product, which is completely in solution, may be concentrated by conventional techniques. For example, the water and excess methanol may be stripped by distillation under reduced pressure. A distillation temperature below about 70° C. is recommended, to avoid formation of insoluble precipitates in the product. The solution may be clarified after concentration by adding adsorbents such as Nuchar, Darco (activated carbons), Filter-cel (diatomaceous earth) and the like. After filtering off the solid adsorbents, the solution is adjusted to the desirable concentration, normally 50% to 70% active ingredient, as determined by nitrogen analysis, which is calculated on the assumption that the product is di-(methoxymethyl)-dimethylol urea.

As already indicated, the product obtained is useful for treating textiles, particularly cotton and viscose rayon and imparts crease-resistant and shrink-resistant properties thereto. For example, the product may be used to pad cotton fabric as follows:

A 5% solution of di(methoxymethyl)-dimethylol urea is prepared from the more concentrated agent obtained above, by dilution with water. 1.5% by weight of commercial magnesium chloride ($MgCl_2.6H_2O$) are added, and cotton cloth is padded with this solution to obtain 100% wet pickup (5% pickup on a dry basis). The treated fabric is dried at 105° C. and then cured at 120° C. for 4 minutes. The fabric is washed with a solution of 0.05% detergent and 0.05% soda ash and then dried. The treated cotton is found to have good crease resistance, to be shrink resistant and when calendered, the calender effect is durable to washing.

Viscose rayon fabric is treated in a similar manner using about three times the amount of di(methoxymethyl)-dimethylol urea. The results are essentially the same.

Without limiting my invention the following examples are given to illustrate my preferred mode of operation. Parts mentioned are by weight; solutions, except where otherwise specified, are aqueous.

Example 1

A stainless steel vessel is charged with 21.71 parts of urea, 62 parts of 37% aqueous formaldehyde solution and 62 parts of methanol. The pH of the mixture is adjusted to 7.7 with a 20% sodium carbonate solution, and the mixture is heated at 70° C. for a period of 2 hours. The reaction mass is then cooled to 25° to 30° C. and 0.51 part of 50% citric acid solution is added, to bring the solution to pH 4.5. The mixture is then heated at 40° C. for a period of one hour. The reaction mass is then made alkaline with 30% sodium hydroxide solution to a pink color on brilliant yellow paper (pH=8.1); 54.6 parts of 37% formaldehyde solution are added, and the reaction mass is heated for 3 hours at 58° to 62° C.

The excess methanol is then distilled off under reduced pressure (100–120 mm.) at about 25° C. Sufficient water is added to bring the residue in the still to a specific gravity of 1.14 at 25° C. This corresponds to a composition containing 58.6% active ingredient, based on nitrogen analysis. The product is clarified by addition of Nuchar (activated carbon) and subsequent filtration, and the pH is adjusted to 7–8 by the addition of acetic acid. The yield of colorless liquid product is 120 parts.

*Example 2*

A glass container is charged with 90 parts of urea, 248 parts of aqueous 37% formaldehyde and 248 parts of methanol. The pH of the mixture is adjusted to 7.6 with 20% sodium carbonate solution, and the mixture is heated at 70° C. for 2 hours. It is then cooled to 35° C. and adjusted to pH 4.5 with 93% sulfuric acid solution. The mixture is heated for one hour at 40° C., after which it is made alkaline (pink to brilliant yellow paper), and 243 parts of 37% aqueous formaldehyde are added. The pH is now adjusted to 9 with caustic soda solution and the mixture is heated to 58° to 62° C. for 3 hours.

At the end of this period, the excess methanol is distilled under reduced pressure (100–120 mm., about 25° C.), and water is added to the remainder in the still to make a 53.7% active ingredient solution. The product is clarified with an activated carbon, and the pH is adjusted to 7–8 with acetic acid. The 548 parts of concentrated solution thus obtained are ready for use by the textile finisher.

*Example 3*

A reaction vessel is charged with 528 parts of methanol, 180 parts of urea and 498 parts of aqueous 37% formaldehyde. The alkalinity of the mixture is adjusted to pH 8.5 by adding 20% sodium carbonate solution, and the reaction mixture is heated at 62° to 72° C. for 2 hours. The pH of the system is checked after one hour's heating and is maintained between 7.6 and 8.0 with sodium carbonate solution.

The reaction product is cooled to 38° C., and the pH is brought down to 4.5 with 95% sulfuric acid. The mixture is heated for ½ hour at 38° to 44° C. The reaction mass is then made alkaline (pink to phenophthalein paper: pH 10–10.5), and 485 parts of 37% formaldehyde solution are added. The pH of the mixture is adjusted to between 9 and 10, and the mixture is heated at 58° to 62° C. for 3 hours, during which period the pH is held between 9 and 10 with the aid of 20% sodium carbonate solution.

The excess of methanol and water is distilled under vacuum at 100 to 120 mm. (about 25° C.), the pH being held between 9 and 10.5 during the distillation, with the aid of 20% sodium carbonate. Sufficient water is added to bring the specific gravity of the residual solution to 1.16 at 25° C. The product is clarified by treating it with an activated carbon, and filtering. The pH of the product is adjusted to about 7–8 by the addition of acetic acid. The aqueous product (840 parts) contains 68% active ingredient.

It will be understood that the details of the above examples may be varied within the skill of those engaged in this art.

I claim as my invention:

A process for the preparation of a crease-proofing agent for textiles which comprises: (a) reacting, at 65° to 75° C. in the presence of aqueous methanol and at a pH of 7.5 to 9.0, essentially 1 mole of urea and 2 moles of formaldehyde, said methanol being present in a mole ratio of methanol to urea of not less than 5:1 and not more than 8:1; (b) cooling the reaction mass to between 20° and 35° C., acidifying it to a pH of 4.0 to 5.0 and then warming it up to between 35° and 45° C. to effect etherification; (c) bringing the pH of the reaction mass to between 8 and 10, adding essentially 2 moles of formaldehyde, and while maintaining the pH between 8 and 10, heating the reaction mass at 55° to 65° C.; and (d) removing the excess alcohol by distillation under reduced pressure and at a temperature below 70° C.

References Cited in the file of this patent

UNITED STATES PATENTS

| 2,645,625 | Bonzagni | July 14, 1953 |
| 2,681,894 | Graz | June 22, 1954 |
| 2,693,460 | Gagliardi | Nov. 2, 1954 |
| 2,749,257 | Knup et al. | June 5, 1956 |

FOREIGN PATENTS

| 516,166 | Belgium | Dec. 31, 1952 |

UNITED STATES PATENT OFFICE

CERTIFICATE OF CORRECTION

Patent No. 2,825,710                    March 4, 1958

Gastao Etzel

It is hereby certified that error appears in the above numbered patent requiring correction and that the said Letters Patent should read as corrected below.

In the heading to the printed specification, lines 2 and 3, title of invention, for "PROCESS OF PREPARING A GREASE-PROOFING AGENT" read --PROCESS OF PREPARING A CREASE-PROOFING AGENT--.

Signed and sealed this 15th day of April 1958.

(SEAL)
Attest:
KARL H. AXLINE

Attesting Officer

ROBERT C. WATSON
Commissioner of Patents